Jan. 6, 1970  G. D. STACY  3,488,480
CHROMATOGRAPHIC DATA INPUT SYSTEM FOR DIGITAL COMPUTER
Filed March 22, 1967  2 Sheets-Sheet 1

INVENTOR.
G. D. STACY
BY Young & Quigg
ATTORNEYS

United States Patent Office 3,488,480
Patented Jan. 6, 1970

3,488,480
CHROMATOGRAPHIC DATA INPUT SYSTEM FOR DIGITAL COMPUTER
Galen D. Stacy, Bartlesville, Okla., assignor to Phillips Petroleum Company, a corporation of Delaware
Filed Mar. 22, 1967, Ser. No. 625,074
Int. Cl. G06f 15/20; G06g 7/48, 7/18
U.S. Cl. 235—151.35    7 Claims

ABSTRACT OF THE DISCLOSURE

A chromatographic data input system for a digital computer is provided whereby signal pulses from any one of a series of sample streams are converted into proper digital form and counted over preselected time periods which correspond to the time sequence of each signal pulse. After each time period, the computer will be automatically interrupted to receive the counted data.

---

This invention relates to a chromatographic analyzer data input system for a digital computer. In another aspect, this invention relates to an improved chromatographic analyzer data input system wherein digital data representative of selected components eluted from a chromatographic column is collected over predetermined time intervals; the computer operation at the end of each time interval being interrupted to allow the collected data to be fed thereto.

The control of fractionation columns and the like is typically accomplished by analyzing at least one of the various fractions therefrom, comparing certain component concentrations in the analyzed fractions with desired set point values, and then adjusting temperature, pressure or stream flow rates which influence the column's separation ability to values which will produce the desired concentrations. Several types of analytical instruments are known which provide a plurality of output signals in sequence that are representative of the individual components of the material being analyzed. One such analyzer utilizes the principles of gas chromatography. A sample of the fluid mixture to be analyzed is introduced into a column which contains material that selectively retards passage therethrough of the individual components of the sample. A carrier gas is directed through the column to elute the individual constituents in sequence. These components often are detected by means of a thermal conductivity cell which measures the differential heat conductivity of the effluent gas from the column as against the carrier gas as reference. The detector cell usually comprises temperature sensitive resistance elements which are connected in a bridge network so that an output voltage signal is established. Other types of analyzers include mass spectrographs, and various types of infrared and ultraviolet analyzers, and others which measure bulk physical properties.

Various chromatographic data input systems for digital computers have been devised whereby analog voltages established by the detecting circuits of the analyzers are converted to digital form and fed directly into a digital computer. However, these systems normally require that data representative of the components eluted from the chromatographic column be collected over the elution period and then fed into the input register of the computer only upon receiving a read or input signal from a chromatograph programmer. These systems either require excessive hardware or take up a relatively long portion of the computer operation. They are solely for receiving input data, and are generally unsatisfactory when it is desired to use multiple process analyzers to transmit data inputs to a computing system.

Therefore, there is needed a flexible chromatographic data input system to control multiple process analyzers and/or a single analyzer for several streams that will not only select the proper stream to be analyzed, but will collect data indicative of the various components within the stream during preselected time periods and then automatically interrupt the computer at the end of each time period.

Accordingly, the object of this invention is to provide an improved system of chromatographic data input to a computer wherein both the chromatographic data transmitter and the data transmitting period are programmed and the computer is ultimately interrupted at the end of the transmitting period for input of the measured data.

Other objects, advantages and features of this invention will be readily apparent to those skilled in the art from the reading of the disclosure.

According to the invention, an improved data input system for a digital computer is provided whereby chromatographic data from any one of a series of sample streams can be collected and fed into the digital computer by programming a selection of the chromatographic data transmitter, programming a selection of the period when counting pulses are transmitted by the selected chromatographic data transmitter, and providing for the automatic interruption of the digital computer at the end of the counting period. Thus, not only can a particular data transmitter be selected, but also the time periods for counting the pulses representative of individual components eluted from the selected data transmitter are selected and programmed for each analysis cycle for each chromatographic data transmitter. By automatically interrupting the digital computer at the end of the counting period, the digital computer is free to continue with other operations during the said counting period. Therefore, that portion of the computer operating period required for receiving input data is minimized.

This invention can be more easily understood from a study of the drawings in which.

Figure 1:
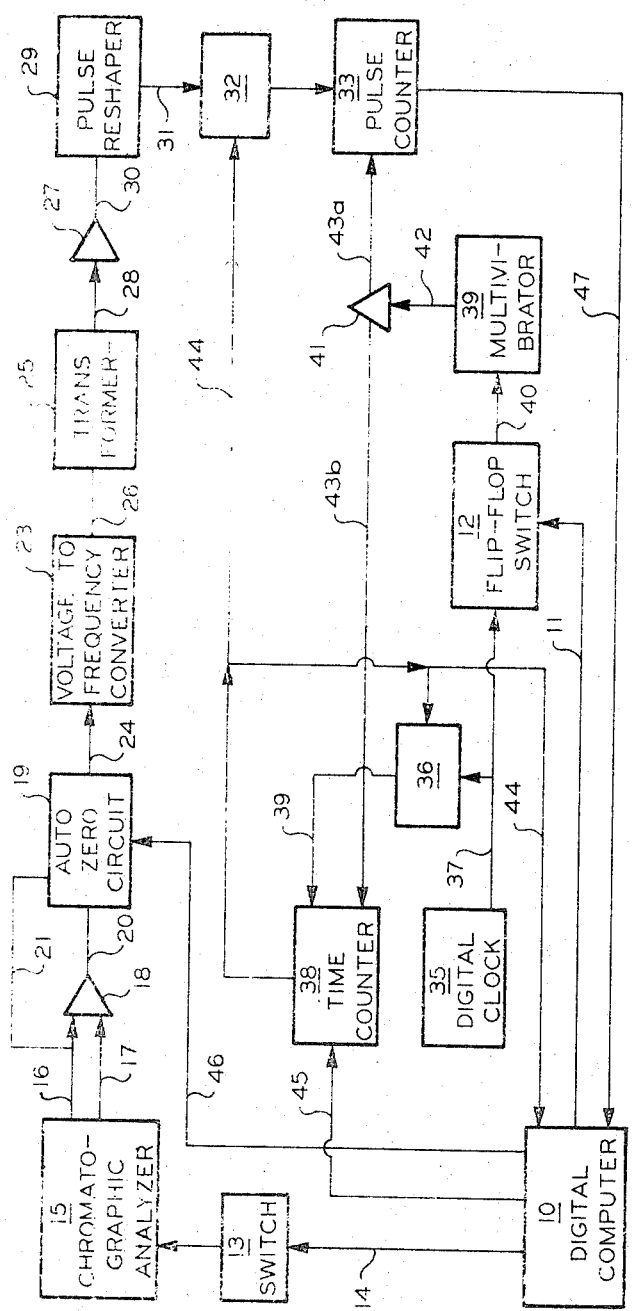
FIGURE 1 is a schematic representation of a preferred embodiment of this invention.

A general description of the basic components of this invention as illustrated in FIGURE 1 will facilitate the understanding thereof. These basic components comprise digital computer 10; a chromatographic signal input data measurement system comprising switch 13, chromatographic analyzer 15, amplifier 18, auto zero circuit 19, voltage to frequency converter 23, transformer 25, amplifier 27, pulse reshaper 29, gate 30, and pulse counter 33; a time sequence measuring system comprising digital clock 35, gate 36, and a time counter 38; and a signal input-time sequence coordination system comprising flip-flop switch 12, multivibrator 39, and amplifier 41.

Figure 2:
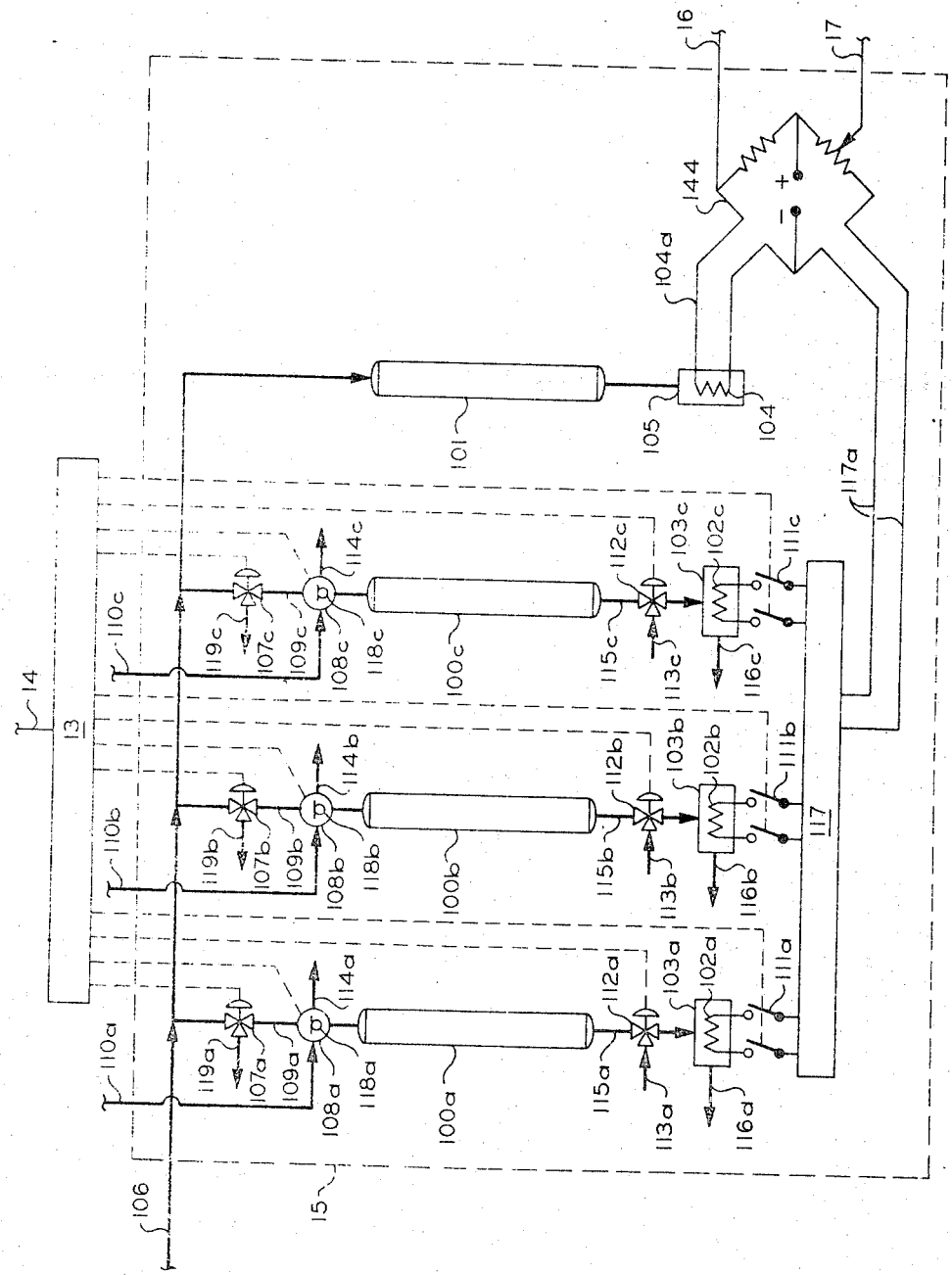
FIGURE 2 is a detail of the preferred embodiment as illustrated in FIGURE 1.

Now, again referring to FIGURE 1, the invention as illustrated is employed to control the transmission of data signals representative of components eluted from a multiple process analyzer which will be described in further detail in the description of FIGURE 2. At the beginning of each counting period, flip-flop switch 12 is in the reset position from the last counting cycle. However, maintaining flip-flop switch 12 in this position has no effect on one shot multivibrator 39. Flip-flop switch 12 can be any suitable flip-flop switch known in the art such as an FA-30 flip-flop distributed by Computer Control Corporation, Framingham, Mass., and illustrated on page 3–89 in Publication No. 71–100A. A suitable multivibrator is the 3C multivibrator distributed by Computer Control Corporation, Framingham, Mass. and illustrated on page 3–163 in Publication No. 71–100A. First, digital computer 10 transmits a signal or signals to switch 13 via control cable 14. This signal is then passed to the correct valve or switch in chromatographic analyzer 15. A typical multicolumn analyzer is illustrated in FIGURE 2, so as to facilitate the description of the inventive method and apparatus. It is to be understood that the following description is exemplary only and that, in view of the wide variety of gas chromatographic analyzers available and of the many differing analytical problems requiring solution, the invention is not limited thereto.

FIGURE 2 illustates a typical multistream process analyzer 15 having three sample columns 100a, 100b, and 100c, and a reference of column 101. Thermistors 102a, 102b, and 102c are disposed in sample detector cells 103a, 103b, and 103c respectively and measure the thermal conductivity of the stream of carrier gas and components contained therein that is eluted from each respective column. Thermistor 104 in reference detector cell 105 measures the thermal conductivity of the reference carrier gas stream from column 101 by means of serving as a thermally-variable resistor connected by leads 104a to Wheatstone bridge circuit 144. Column 101 as illustrated is similar to columns 100a–100c and its purpose is to provide approximately the same pressure drop of the reference carrier gas stream through column 101 as the pressure drop of the carrier gas streams that flow through the respective sample columns 100a–100c. Therefore, the velocity and pressure conditions of the carrier gas striking thermistor 104 will be approximately the same as the velocity and pressure conditions under which the carrier stream containing the eluted components strikes thermistors 102a–102c. Thermistors 102a–102c are connected to relay means 117 and by leads 117a to Wheatstone bridge 144. If one of the switches 111a–111c is closed, signals from a respective thermistor 102a–102c will be transferred to Wheatstone bridge 144. Leads 16 and 17 conduct the output signals from the bridge to amplifier 18 (FIGURE 1). The use of thermistor detectors is in no way intended to limit the scope of this invention. This invention will work equally well with other detectors known in the art such as flame ionization detectors and mass spectrographs. Also, the number and relative size of the chromatographic columns illustrated in FIGURE 2 is in no way intended to limit the scope of this invention. For example, columns having different cross sectional areas and lengths can be used depending upon the particular sample stream to be analyzed.

Carrier gas conduit 106 is connected to inlet valves 107a, 107b, 107c, and the inlet of reference column 101. Sample valves 108a, 108b, and 108c are disposed in conduits 109a, 109b, and 109c, respectively. Sample conduits 110a, 110b, and 110c are connected to inlet ports of sample valves 108a, 108b, and 108c, respectively. Sample valves 108a, 108b and 108c can be the pneumatically operated valve mechanism disclosed in U.S. Patent 3,140,615. Back flush valves 112a, 112b and 112c are disposed within conduits 115a, 115b and 115c, respectively. Back flush valves 112a–112c can be a similar type mechanism as valves 108a–108c. Back flushing gas conduits 113a–113c communicate with inlet ports of back flushing valves 112a–112c, respectively.

Generally, in the operation of the chromatographic analyzer 15, when valves 107a–107c are in a first position, carrier gas from conduit 106 will flow therethrough and when sample valves 108a–108c respectively are in a first position, carrier gas will flow therethrough and through columns 100a–100c and detector cells 103a–103c, exhausting via conduits 116a–116c, respectively. When sample valves 108a–108c are in this first position, sample streams from conduits 110a–110c respectively will flow through and flush out sample loops 118a, 118b, and 118c and out conduits 114a, 114b and 114c respectively. When back flushing valves 112a, 112b and 112c are in a first position, carrier gas will flow from the columns through conduits 115a, 115b and 115c, through back flushing valves 112a, 112b and 112c, and through detector cells 103a–103c. When sample valves 108a–108c are placed in a second position, carrier gas from conduits 109a–109c will pass through sample loops 118a–118c and push respective samples trapped within the sample loops into the respective columns. This process will initiate the elution of components through the chromatographic columns. To back flush the columns, valves 107a–107c are placed in a second position, and valves 112a–112c are placed in a second position. Carrier gas will then flow from conduits 113a, 113b and 113c through back flushing valves 112a–112c, through the respective columns and out conduits 119a, 119b and 119c respectively. Thus, switch 13 will operate the respective valves and switches illustrated in chromatographic analyzer 15 in response to signals received from digital computer 10. Switch 13 can be any type switching device known in the art such as a series of cams fixed on a shaft which operate respective switching relays.

Figure 3:
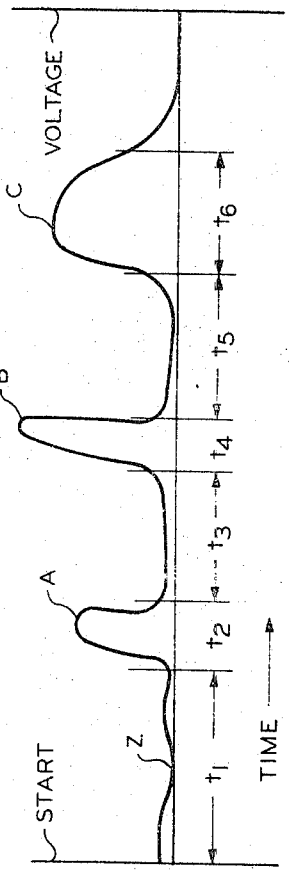
FIGURE 3 is a typical graph illustrating the output of a chromatographic analyzer used in this invention.

The operation of this apparatus will be described with reference to FIGURES 1, 2 and 3 in relation to an analysis cycle wherein components are eluted through chromatographic column 100a and detector cell 102a. FIGURE 3 is a typical plot of the bridge 144 output signal (voltage) versus time on which the elution peaks of the various components of sample stream 110a are displayed in a form suitable for quantitative analysis. Following injection of a small-sized sample of stream 110a into chromatographic column inlet stream 109a by action of sampling valve 108a, the various components are eluted through the column by the carrier gas stream, at differing rates due to the nature of the components, and the stationary phase (solid and liquid if used), exhibiting differing retention times within the column. Thus, in the operation of the chromatographic analyzer, only switch 111a will be in the closed position. Carrier gas will be flowing downward through the respective columns unless a particular column is in a back flushing cycle. Therefore, to illustrate the operation of column 100a, the signal transmitted from digital computer 10 to switch 13 will actuate sample valve 108a and place it in its second position to thereby allow carrier gas flowing through valve 108a to push a measured slug of sample into chromatographic column 100a. Thus, an elution cycle has begun.

At this time, or shortly prior thereto, digital computer 10 will transmit a signal or signals via cable 45 which may represent the time ($t_1$ in FIGURE 3) it will take the first component in a sample stream to be eluted through chromatographic column 100a. For example, the time interval can be from 1 second to 15 minutes. It must be noted, that digital computer 10 can at any time transmit a signal or signals to switch 13 which will actuate any of the valves or switches of analyzer 15. For example, valves 107b, 118b and 112b can be placed in their second positions to thereby allow column 100b to be back flushed, and if the sample components supplied by conduit 110c require substantially longer elution times then the components supplied by conduit 110a, sample valve 108c can be placed in its second position to thereby allow carrier gas to carry a slug of sample to column 100c and initiate elution thereof. Also, at this time or at any time when no components are being detected by thermistor 102b, computer 10 can transfer an automatic zero signal to auto zero circuit 19 via channel 46. This auto zero signal will actuate auto zero circuit 19 and cause the output from amplifier 18 to be zeroed (position Z of FIGURE 3) and in effect to adjust any drift or inaccuracies that occur in Wheatstone bridge 144 as time goes by. The effect of this is to provide a continuous bias to the bridge via feedback circuit 21 which is opposite and substantially equal in magnitude to the unbalance signal produced. Any auto zero circuit known in the art can be used in this invention such as the auto zero circuit disclosed in U.S. Patent No. 3,247,703.

Digital clock 35 is constantly emitting a known number of pulses per unit of time, such as one pulse per second. These pulses are transmitted via channel 37 to gating switch 36 and to flip-flop switch 12. Gating switch 36 is a conventional Nand gate such as one disclosed in the article "Nor/Nand Logic the Easy Way" by Charles F. Hill on pages 81 to 83 of Control Engineering Magazine, published in May 1964. Gating switch 36 transmits these pulses to time counter 38 via channel 39 until as inhibit signal is transmitted thereto via channel 44. Time counter 38 can be any type of pulse counter such as a binary, decimal, duo-decimal, or octalcounter; however, it is preferred that pulse counter 38 be a 6 to 8 bit binary counter, depending upon the time intervals to be measured. The pulses passing to flip-flop switch 12 via channel 37 have no effect upon the state of flip-flop switch 12 until flip-flop switch 12 is set in its second stable state by pulse signals from computer 10 via channel 11.

When the elution time of the first component from column 100a is completed ($t_1$ in FIGURE 3) and peak A is about to appear at thermistor 102a, time counter 38 will transmit an interrupt signal to digtial computer 10 by channel 44 and to Nand gate 32 which is similar to Nand gate 36. This will cause a set signal to be transferred to flip-flop switch 12 from computer 10 via channel 11 which will thereby cause flip-flop switch 12 to change its state and become conditioned for reception of a reset pulse from channel 37. Therefore, the next pulse to reach flip-flop switch 12 via channel 37 from digital clock 35 will reset flip-flop switch 12 and result in a pulse being transmitted to one shot multivibrator 39 via channel 40. The resulting output from one shot multivibrator 39 will pass to non-inverting amplifier 41 via channel 42. A corresponding amplified output will pass to pulse counter 33 and time counter 38 via channels 43a and 43b respectively. Pulse counter 33 can be a similar type counter as time counter 38. This one shot pulse will reset time counter 38 to zero and will last longer than the duration of the short pulse emitted from digital clock 35 (1 second, if 60 pulse per minute clock is utilized) in order to keep the first bit in time counter 38 from being pulsed before it is reset. The one shot pulse transmitted via channel 43a will also reset counter 33 if the counter has been actuated prior to this time.

At this time or shortly prior thereto, digital computer 10 will transmit a second time signal or signals via cable 45 which represents the time interval ($t_2$ in FIGURE 3) in which the first component eluted through column 102a is to be measured. The analog signal which is representative of the first component A from column 102a will pass from amplifier 18 to voltage to frequency converter 23 via channel 20, auto zero circuit 19 and channel 24. This signal is then applied to the input of voltage to frequency converter 23 which provides an output alternating signal, the frequency of which is directly proportional to the magnitude of the input voltage. A suitable converter for this purpose is the DY-2210 converter manufactured by Dymec Incorporated, Palo Alto, Calif. and which is described in Control Engineering, March 1959, page 144. The resulting alternating signals then pass to isolation transformer 25 via channel 26. The resulting signals from isolation transformer 25 are passed to amplifier 27 via channel 28 wherein they are amplified to the proper magnitude to form resulting amplified signals which are passed to pulse reshaper 29 via channel 30. Pulse reshaper 29 reshapes these signals, which are in the form of alternating current signals, into square wave signals of the digital form desired for triggering succeeding circuitry. An instrument capable of reshaping the alternating current signals is known as the ST-1 dual Schmidt Trigger distributed by Computer Control Corporation, Framingham, Mass. and illustrated in Publication No. 71-100A. The reshaped pulses are transmitted to gating switch 32 via channel 31. Gating switch 32 transmits the reshaped pulses received via channel 31 to pulse counter 33 via channel 34 until an inhibit signal is transmitted to gating switch 32 via channel 44.

Thus, as a result of the second actuating signal (ultimately 43b) from digital computer 10 to flip-flop switch 12, and the second time signal 45 from digital computer 10 to time counter 38, time counter 38 is counting pulses from digital clock 35 which are indicative of the desired time interval for measuring the first component A from column 102a. Also, pulses indicative of the voltage output from amplifier 18, which are in turn indicative of the differential thermal conductivity, of the first component in carrier gas referenced against carrier gas measured by thermistors 102a and 104 and transmitted by bridge 144, are being counted by pulse counter 33.

When the selected time interval has expired, an inhibit signal will pass from time counter 38 to gating switches 36 and 32 via channel 44. This inhibit signal will prevent further pulses from passing to pulse counter 33 via channel 34 and it will prevent time pulses from digital clock 35 from passing to time counter 38 via channel 39. In effect, this inhibit signal will stop all counting operations. The inhibit signal will also simultaneously pass as an interrupt signal to digital computer 10 via channel 44. After this signal has entered digital computer 10, the computer operation will become interrupted for a time sufficient to allow the counted pulses representative of process variables to be passed from pulse counter 33 into the computer input register via channel 47. Thereby a complete cycle of operation has been carried out, and a new cycle is begun by the transference of a signal to flip-flop switch 12 via channel 11, and the transference of a signal representative of another time increment ($t_3$ on FIGURE 3) to time counter 38 by channel 45. In this manner, the output voltages from amplifier 18 which are indicative of the respective differential thermal conductivities of the components eluted from column 100a are measured and passed to the input register of digital computer 10.

It must also be noted, that the elution time of various components within column 100a–100c can be controlled by controlling the temperature of the column and the flow rate of the carrier gas therethrough, in a manner known in the art. This elution control may be necessary when two components are superimposed upon one another as they are eluted from the column. Thus, by heating or cooling the column or varying the flow of carrier gas, the peaks can be separated and measured with the apparatus of this invention.

Typical time interval selections for measuring individual components are illustrated in FIGURE 3. The time intervals $t_2$, $t_4$ and $t_6$ are utilized to measure the voltage peaks from amplifier 18 which are representative of components A, B and C respectively. Thus, reproducible results can be obtained for sample streams having the same components therein or for individual sample streams wherein it is desired to continuously measure the concentration of the components contained therein. Thus, under the same temperature and carrier gas flow conditions, the amplitude of the voltage for a particular component will vary as the concentration of that component within the sample varies. Therefore, it is readily seen that reproducible results can be obtained by measuring voltage peaks indicative of the same component in different runs over the same preselected time interval.

Also, this invention can be utilized to detect and measure the concentration of only selected components within any sample stream. Thus, if it is desired to detect only component B (FIGURE 3) within the stream eluted from column 100a, time counter 38 will initially measure an interval equal to $t_1+t_2+t_3$. After this period, the one shot pulse will reset time counter 38 and pulse counter 33, and time counter 38 will measure time $t_4$ while pulse counter 33 records digital pulses representative of the voltage amplitude B, etc.

It will be understood that the above-described embodiments of the invention are illustrative only and are not intended to limit the scope of this invention.

I claim:

1. Apparatus comprising in combination, a chromatographic analyzer adapted to provide a plurality of output voltages in sequence, each representative of a component of the material being analyzed; voltage to frequency converter means to provide a series of pulses having a frequency proportional to an input voltage; means to apply said output voltages to the input of said voltage to frequency converter; means for converting signal pulses representative of the material being analyzed from said voltage to frequency converter means into digital form; means for passing signal pulses from said voltage to frequency converter to said means for converting signal pulses into digital form; first counting means for counting the frequency of digital pulses; first gate means for passing digital pulses from said means for converting signal pulses to said first counting means; digital clock means for producing digital signals having a constant frequency; second counting means for counting said digital signals from said digital clock means; second gate means for passing digital signals from said digital clock means to said second counting means; digital computer means; switch means; means for passing set signals from said digital computer means to said switch means; means for passing reset signals from said digital clock to said switch means to actuate said switch means and cause a reset signal to be transferred therefrom; means for passing said reset signal to said first and second counting means; means for passing signals representative of time periods to be counted from said digital computer means to said second counting means; means for passing an inhibit signal from second counting means to said first and second gate means; means for passing an interrupt signal from said second counting means to said digital computer means simultaneously with said inhibit signal; means for passing signals representative of counted pulses from said first counting means to said digital computer means, means for passing operating signals from said digital computer to said chromatographic analyzer.

2. The apparatus of claim 1 wherein said chromatographic analyzer comprises a plurality of chromatographic column means, means to pass carrier gas through each of said chromatographic column means, means to inject sample fluid into carrier gas passing through each of said chromatographic column means, sample detector means for detecting sample components in the carrier gas eluted from each of said chromatographic column means, reference detector means, means to pass carrier gas to said reference detector means, bridge circuit means connecting said sample detector means to said reference detector means for producing a differential output therefrom.

3. The apparatus of claim 2 further comprising amplifier means for amplifying said differential output, auto zero circuit means to provide a continuous bias to said bridge circuit means, and means for transferring an actuating signal from said digital computer means to said auto zero circuit means.

4. The apparatus of claim 3 wherein said means for passing said signal pulses from said voltage to frequency converter means to said means for converting signal pulses into digital form comprises isolation transformer means, means for passing said signal pulses from said voltage to frequency converter means to said isolation transformer means, amplifier means, means for passing signal pulses from said isolation transformer means to said amplifier means, and means for passing signal pulses from said amplifier means to said means for converting signal pulses into digital form.

5. The apparatus of claim 4 wherein said means for passing said reset signal to said first and second counting means comprises one shot multivibrator means, means for transmitting said reset signal from said switch to said one shot multivibrator means, non-inverting amplifier means, means for transferring a reset signal from one shot multivibrator means to said non-inverting amplifier means, means for transferring an amplified reset signal from said non-inverting amplifier means to said first and second counting means.

6. The apparatus of claim 5 wherein said digital clock means passes digital signals at a frequency of 60 pulses per minute.

7. The apparatus of claim 6 wherein said first and second counting means are binary counter means.

References Cited

UNITED STATES PATENTS 3,119,995  1964  Burk et al. _____ 235—151.35 XR

MALCOLM A. MORRISON, Primary Examiner

E. J. WISE, Assistant Examiner

U.S. Cl. X.R.

73—23.1; 235—92, 183